United States Patent
Clark

(10) Patent No.: US 9,442,002 B2
(45) Date of Patent: Sep. 13, 2016

(54) REMOTE OPTICAL SENSING OF THE INTEGRITY OF A STRUCTURE USING REFLECTED OR SCATTERED LIGHT

(71) Applicant: Spectral Sciences, Inc., Burlington, MA (US)

(72) Inventor: Frank Oliver Clark, Lincoln, MA (US)

(73) Assignee: Spectral Sciences, Inc., Burlington, MA (US)

( * ) Notice: Subject to any disclaimer, the term of this patent is extended or adjusted under 35 U.S.C. 154(b) by 150 days.

(21) Appl. No.: 14/160,838

(22) Filed: Jan. 22, 2014

(65) Prior Publication Data

US 2014/0211207 A1     Jul. 31, 2014

Related U.S. Application Data

(60) Provisional application No. 61/757,831, filed on Jan. 29, 2013, provisional application No. 61/842,021, filed on Jul. 2, 2013.

(51) Int. Cl.
| | |
|---|---|
| G01B 11/16 | (2006.01) |
| G01H 9/00 | (2006.01) |
| G01M 5/00 | (2006.01) |
| G01M 11/08 | (2006.01) |

(52) U.S. Cl.
CPC ............. *G01H 9/00* (2013.01); *G01B 11/16* (2013.01); *G01M 5/0066* (2013.01); *G01M 5/0091* (2013.01); *G01M 11/081* (2013.01)

(58) Field of Classification Search
CPC .... G01H 9/00; G01N 21/4738; G01N 21/21; G01N 21/55; G01B 11/16; G01M 11/081; G01M 5/0091; G01M 5/0066
See application file for complete search history.

(56) References Cited

U.S. PATENT DOCUMENTS

| | | | | |
|---|---|---|---|---|
| 4,480,480 | A | * | 11/1984 | Scott ................... E02B 17/0034 702/41 |
| 5,026,141 | A | * | 6/1991 | Griffiths ................ G01B 11/18 250/227.14 |
| 5,186,146 | A | * | 2/1993 | Sohma ................. G01J 5/0014 123/406.28 |
| 5,225,810 | A | * | 7/1993 | Inoue ................... G08B 17/103 250/574 |

(Continued)

FOREIGN PATENT DOCUMENTS

FI    WO 2009095546 A2 *   8/2009    ......... G05B 19/0423

OTHER PUBLICATIONS

"Applications Guide: System Smoke Detectors," advanced ideas, advanced solutions, 2012.*

(Continued)

*Primary Examiner* — Harshad R Patel
*Assistant Examiner* — Samir M Shah
(74) *Attorney, Agent, or Firm* — Brian M. Dingman; Dingman IP Law, PC

(57) ABSTRACT

A method and device for remotely detecting structural integrity using reflections or scattering from windows or other portions of a structure. The long geometrical lever arm of a reflection on a building window, when viewed with suitable instruments, produces detectable modulation in the reflected light from minute vibrational changes upon the glass surface, revealing fundamental resonances and structural changes and failure in the building housing the window. By sensing very small changes in intensity and polarization, information may be obtained on fundamental resonances and structural changes, including failure or imminent failure of the structure.

19 Claims, 5 Drawing Sheets

(56) References Cited

U.S. PATENT DOCUMENTS

| | | | | |
|---|---|---|---|---|
| 5,612,539 | A * | 3/1997 | Hoshi | G01N 21/6489 250/341.4 |
| 5,814,816 | A * | 9/1998 | Nadolink | G01L 5/0047 250/340 |
| 5,841,130 | A * | 11/1998 | Ahmad | G01B 11/18 250/227.14 |
| 6,335,853 | B1 * | 1/2002 | Kitagawa | B60L 3/04 361/103 |
| 8,448,715 | B2 * | 5/2013 | Munro | G08B 17/125 169/54 |
| 8,560,275 | B2 * | 10/2013 | Mustonen | G05B 19/0423 702/121 |
| 8,599,044 | B2 * | 12/2013 | Maggiore | G07C 5/008 340/438 |
| 8,712,634 | B2 * | 4/2014 | Followell | B64F 5/0045 244/100 R |
| 2005/0012626 | A1 * | 1/2005 | Owrutsky | G08B 17/125 340/578 |
| 2006/0202844 | A1 * | 9/2006 | Farley | G08B 21/02 340/577 |
| 2007/0207242 | A1 * | 9/2007 | Carlsen | A22B 5/007 426/231 |
| 2012/0185185 | A1 * | 7/2012 | Bae | H04Q 9/00 702/58 |
| 2013/0162269 | A1 * | 6/2013 | Julicher | G01R 19/25 324/658 |
| 2013/0173178 | A1 * | 7/2013 | Poczka | G01M 3/2807 702/24 |
| 2015/0054670 | A1 * | 2/2015 | Wang | G01S 13/0209 342/21 |

OTHER PUBLICATIONS

"Monitoring Systems for Grinding Processes," Bernhard Karpuschewski and Ichiro Inasaki, pp. 83-109, Otto-von-Guericke-University Magdeburg, Germany; Keio University, Japan; published as Chapter 4, a part of the book, "Condition Monitoring and Control for Intelligent Manufacturing," Lihui Wang and Robert X. Gao (Eds.), Springer Series, 2005.*

Duron ZH; Yoder N; Kelcher R; Hutchings A; Markwardt S; and Panish R [2005]. Fire induced vibration monitoring for building collapse. Final report: Aug. 1, 2002 to Jul. 31, 2005. NIST Report: GCR 06-885. National Institute of Standards and Technology. Gaithersburg, MD. Building and Fire Research Laboratory.

Favela, J. "Energy Radiation from a Multi-Story Building", Ph.D. Thesis, CalTech defended Apr. 29, 2004.

Duron, Z.H., Prof of Engineering, Harvey Mudd College, Claremont, CA "Stability Monitoring of Burning Structures Based on Fire-induced Vibration Monitoring".

Viegas, et al. Acoustic Characterization of a Forest Fire Event, Transactions on Ecology and the Environment, vol. 119, 2008.

* cited by examiner

REMOTE OPTICAL SENSING OF THE INTEGRITY OF A STRUCTURE USING REFLECTED OR SCATTERED LIGHT

CROSS-REFERENCE TO RELATED APPLICATIONS

This application claims priority of Provisional Patent Application Ser. No. 61/757,831, filed on Jan. 29, 2013. This application also claims priority of Provisional Patent Application Ser. No. 61/842,021, filed on Jul. 2, 2013.

FIELD

This disclosure relates to the sensing of light that is reflected from or scattered by a structure, and the use of the sensed light to determine the integrity of the structure.

BACKGROUND

Accurate detection of the structural integrity of buildings, aircraft, and other structures typically depends upon physical contact between a sensor and the structure, or actual visual inspection. There is a need for rapid remote determination of structural integrity, aging, and incipient failure before a catastrophic event, including but not limited to structural element failure or incipient failure caused by events such as earthquakes and fires.

SUMMARY

The present disclosure takes advantage of the fact that optical intensity modulation of light that is reflected or scattered from a vibrating surface may be used as a remote accelerometer for the surface. One use of this technique is to detect light that is reflected or scattered from a surface of a building or other structure. Minute surface vibrations can be detected via reflected or scattered light detection. Such vibrations can be used to remotely determine the integrity of a structure.

The techniques can be accomplished with long geometrical lever arm of either reflections or scattering from windows or other reflective material that is part of a structure such as a building. The techniques can be used to determine the integrity of the structure (e.g., building) by sensing sub-micron level surface vibrations from the glass or other reflective or scattering surface. This approach permits rapid, passive, and very sensitive scanning of large buildings or other structures with a suitable optical device and geometry. This can be used to directly measure resonant frequencies and systemic structural damping of structures, both of which are measures of the integrity of a structure, aging effects on a structure, and damage such as that which may be caused by disasters such as fire or earthquake.

It is known that measuring building surface vibrations permits prediction of structural problems and potential collapse from fire-related damage several minutes before the actual collapse. The subject remote optical detection approach permits the determination of potential collapse before a building is entered, and without the need for sensors that are attached to the structure. The technique thus may be applied to any existing building without the need for retrofit.

Under suitable conditions, an optical imaging device measuring scattered light from a building surface (e.g., a window) can measure surface deformations as small as $10^{-10}$ meters, or $1/1000$ of a micrometer. These numbers were obtained by an instrument with a sensitivity to modulated light arising from a vibrating surface of $10^{-6}$ of that from a non-vibrating surface. See FIG. 1 for a schematic representation of the device in use extracting the structural integrity of a structure such as a building via detection of reflected or scattered ambient light. This remote measurement technique is comparable to levels achievable with a mechanical accelerometer placed on the building surface, and with proper optics can easily exceed that achievable with an accelerometer. An imager operating with this mode can quickly survey both accessible and inaccessible structures both for short term health (e.g., earthquake damage or discrete structural damage) and for long term monitoring of aging and changes.

A utility of the technique is that miniscule deformations of a building exterior become ultrasensitive indicators of all internal building resonances and damping, whether such are mechanically coupled to the exterior through the building frame, or acoustically coupled by air. Also, no sensors or other hardware need to be placed on or in the structure. This approach may be used on any existing building, including high rise buildings where each floor can be examined as desired.

This disclosure features methods for non-contact sensing of the integrity of a structure. In one example, the method includes remotely detecting light that has been reflected off of or scattered from the structure, and analyzing the detected light to determine the integrity of the structure. The analyzing step may comprise determining the intensity and polarization of detected ambient light. One or more polarization filters may be used to filter the reflected light before it is analyzed. The analyzing step may further comprise resolving one or more peaks in the power spectrum of the detected light, which may be accomplished by determining the frequency of the peaks. Other methods of remotely extracting surface vibration information content of structures are also included. For example, as joints fail in a building the discrete component resonance breaks up into multiple frequencies and the overall frequency content shows discontinuities.

The light may be detected over time, and the analyses thereof may be stored and compared. The comparisons may be used to detect gradual structural changes in the structure. The structure may be scanned so as to survey different areas of the structure. The analyzing step may comprise creating a pixel-by-pixel frequency map of the scanned areas. The method may further comprise actively illuminating the structure with polarized light so as to enhance the results.

The analyzing step may comprise determining whether there is a fire in a building or other structure. The detected light may be analyzed for characteristic acoustic emanations of a fire. The detected light may be analyzed for frequency content indicative of fire, and the extent of and size of the fire. The magnitude of sensed building vibrations may be indicative of the location of the fire; the fire may be located close to the location of the greatest magnitude vibrations.

The analyzing step may comprise determining whether the building structure has degraded. The detected light may be analyzed for changes in damping of vibration by the building structure. A decrease in damping may be equated with structural degradation. The detected light may be analyzed for frequency content indicative of structural degradation. The detected light may be analyzed for high frequency cutoff, which can be indicative of the volume of the fire.

BRIEF DESCRIPTION OF THE DRAWINGS

Other objects features and advantages will be apparent to those skilled in the art from the following detailed description and the accompanying drawings, in which.

DETAILED DESCRIPTION

A utility of the subject detection system and technique is the ability to use natural reflections or scattered light to passively and remotely determine structural integrity and aging effects of buildings or other structures that are stimulated by normal low level seismic background, wind, fire, or other activity within the structure (such as elevators, people walking, etc.). The system and technique can also be utilized to monitor structures over long periods of time, revealing any gradual structural failures, which may for example be evidenced in shifting vibrational modes or declining damping properties of the building or other structure. The technique may be used by firefighters or others present at a building fire to monitor changes in structural integrity, for pre-collapse warning.

Figure 1:
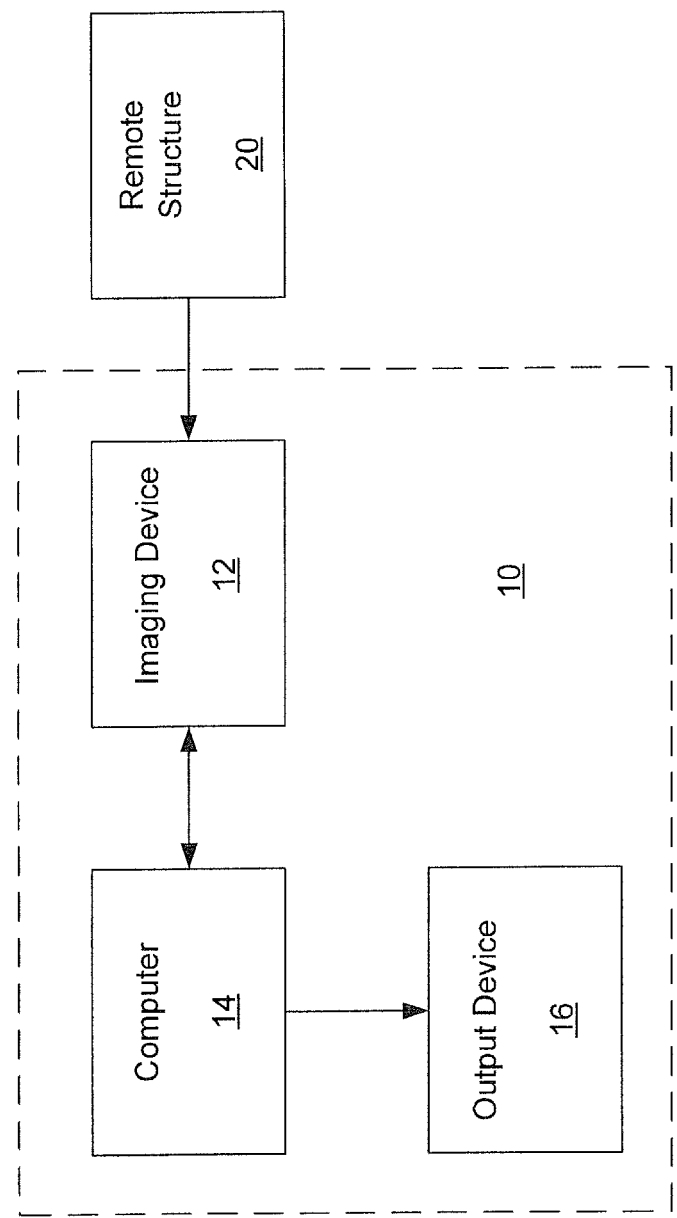
FIG. 1 is schematic block diagram of a remote optical sensing system according to the present disclosure.

Remote optical sensing system 10, FIG. 1, may also be used to practice the techniques disclosed herein. System 10 includes an imaging device 12 that captures reflected and or/scattered light from structure 20 that is remote from device 12. The acquired reflection/scattering data is provided to computer 14 which performs the calculations described herein. Desired outputs of computer 14 are provided to output device (e.g., printer or display) 16.

Non-Limiting Examples of the Disclosure

Figure 2:
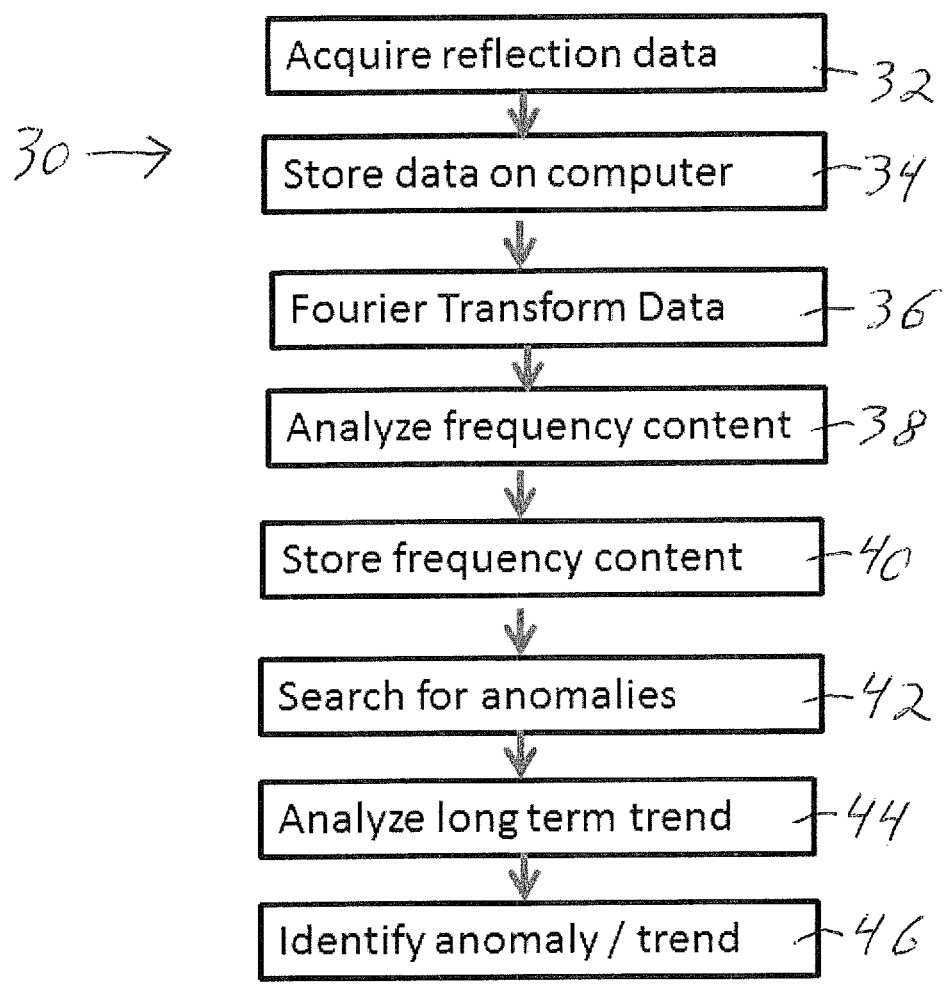
FIG. 2 is a flow chart of a remote optical sensing method according to the present disclosure.

A basic flow chart of a remote optical sensing method 30 is shown in FIG. 2. In this non-limiting example reflection data is used, but scattering data could also be used. Reflection data is acquired, step 32. The data is stored on a computer, step 34. The data is Fourier transformed using the computer, step 36, and the frequency content is analyzed and then stored by the computer, steps 38 and 40. This data may then be compared to previously-collected or historical data by searching for anomalies, analyzing long term trends and identifying anomalies/trends, steps 42, 44 and 46. Examples of anomalies include but are not limited to monitoring the stability of burning structures based on fire-induced vibration monitoring; and monitoring the long-term structural health and joint degradation of buildings such as may be caused by aging or earthquakes or other trauma.

When scattered ambient light is utilized (although active illumination may be used to enhance the results), red-sensitive detectors (typically with a peak response in the range of 700-900 nm) are preferred, so as to match the maximum number of photons in the scattered ambient light that are detected.

The data are preferably acquired by an imaging camera with electron well depth of at least 10,000, preferably much larger, and frame rate of at least 30 frames/second (faster frame rates sample smaller structural elements), with a polarizing filter, attached to a long focal length optical system on a reasonably secure mounting system. Long focal length optics, e.g., f ratio>1000, provide standoff range. The data are processed by a computer using a Fourier Transform to the frequency domain, Principal Component Analysis to the anomaly domain, or Random Decrement Method to the systemic damping domain, or equivalent analysis technique to transform from the intensity domain to the time domain in the desired measured quantity (such as frequency or damping).

EXAMPLE

Figure 3:
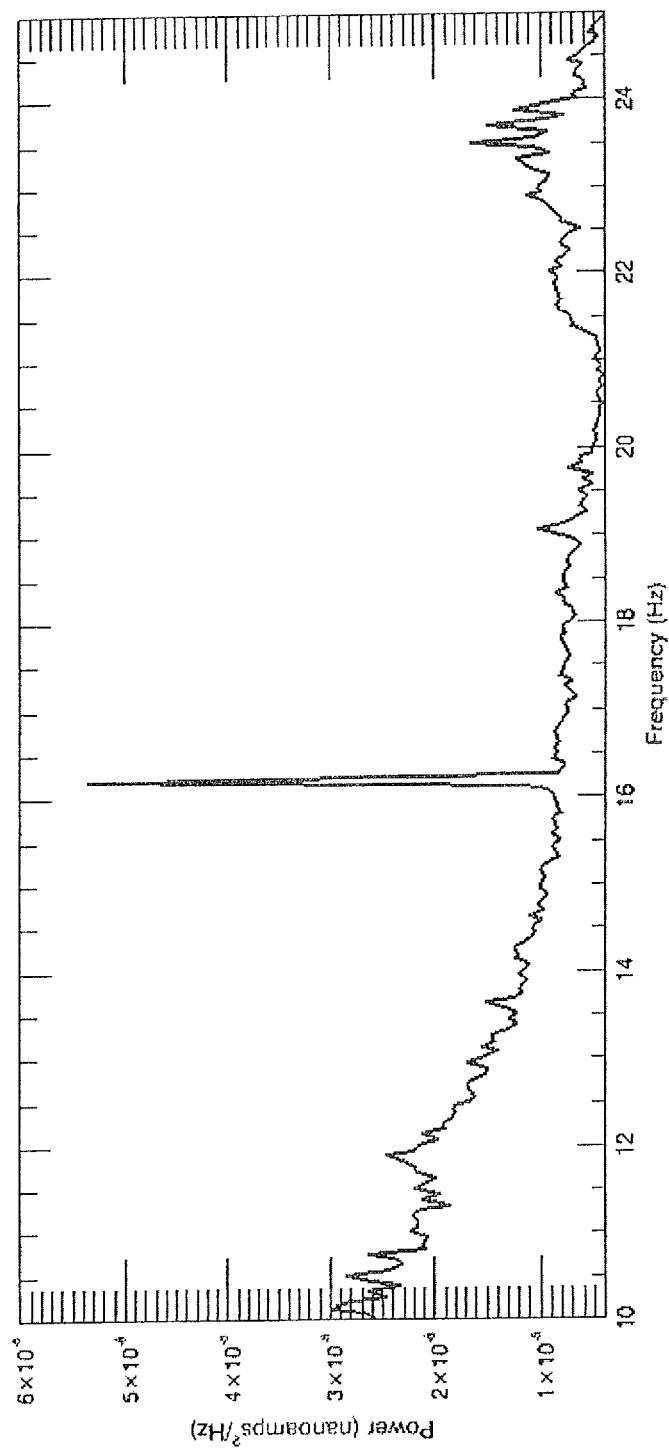
FIG. 3 is a power spectrum illustrating a use of the system and method herein.

The sensitivity of the detection techniques are illustrated with an example taken from the wall of a three story steel I-beam concrete enclosed building, which revealed a very intense and sharp 16 Hz resonance that was traced to a poured concrete encased steel I-beam with a structural integrity problem that produced a classical drum-head vibrational mode in the floor of the room. See FIG. 3. This very minor completely concealed structural flaw had been an undiagnosed problem for years, but was not recognized or isolated because the drum head mode was sub-audible. While this 16 Hz resonance was detected on many surfaces of the building, it exhibited greatest intensity on the room with the flaw, and was precisely located with a mechanical accelerometer within that room. This example shows the power of the present remote optical accelerometer technique to uncover relatively minor building structural flaws that are completely hidden to visual inspection.

Methods of Enhancement of the Technique

When glass is under tension or stress, as often happens especially in large buildings, reflections are profoundly distorted. In this case, the reflected light is expected to be polarized, and polarized light is anticipated to be considerably more sensitive to surface vibration than intensity alone, so buildings with stressed glass should be even more sensitive to this detection technique, producing even greater sensitivity to natural building vibrational modes. These may be monitored over a period of time, revealing changes in structural integrity. Therefore polarization is expected to provide greatly increased sensitivity to all of these phenomena.

If a small eye safe laser is used for illumination, the scattered light would be polarized, and polarization would be expected to increase the sensitivity of scattered light to surface vibration. This technique should be exquisitely sensitive to high rise buildings which often have stressed glass windows, producing even greater sensitivity to natural building vibrational modes. These may be monitored over a period of time, revealing changes in structural integrity. Therefore polarization will provide increased sensitivity to these phenomena.

An additional potential way to increase sensitivity is to detect the difference between the two reflections in double pane windows, which requires higher spatial resolution on the object causing the reflection.

Nominal active illumination can be used for nighttime use, which may be an eye safe laser, or any source of illumination, and may be used to show where the measurement is being made if desired.

The techniques may also be used to quickly scan the surface of an aircraft, ship or motor vehicle for structural integrity and comparing the scans to historical records and digital models. The techniques can be used to detect surface damage such as heat damage, delamination, cracks, bonding flaws or manufacturing flaws. The techniques can also be used for long term monitoring of aircraft, ship or motor vehicle structural health, quick surveys of tunnel ceiling panels, optically surveying railroad rail integrity (e.g., using an optical sensor on the front of a train), and monitoring of above ground pipelines. Other uses may be evident or may become evident. A sensor on an unmanned aerial vehicle above a train could be used to image a seismic bow shockwave from the train so as to detect track flaws and potential ground surface support issues.

All of these applications may be enhanced by active illumination, and an intrinsically polarized illumination source provides further enhanced sensitivity.

The effects may also be detected by an alternative non-imaging device that may be constructed with a large dynamic range detector, large dynamic range transimpedance amplifier, following industry standard isolation and noise reduction techniques, large dynamic range analog to digital converter, and analogous Fourier Transform or comparable processing. In this embodiment, careful attention should be paid to connecting the detector directly to the transimpedance amplifier with no ground loops (for example, no printed circuit boards), carefully cleaning both the detector and amplifier housings, desiccating the results, and housing in a sealed humidity free enclosure to minimize stray 1/f noise, and the mounting requirements for a non-imaging device are more stringent.

Fire and Disaster-Related Detection

Fire produces noise by at least two processes. The first is thermal expansion, which results in slip, creak, and groan of materials near the fire. The "snap" and "crackle" of a high temperature fire are evidenced by high frequency content (above 100 Hz). It has been demonstrated that detecting this acoustic characteristic of a fire is as sensitive as any technique for fire detection. The second method by which fire generates noise occurs from turbulence in the combustion process, and the shedding of vortex structures. These vortex structures have been studied and have been shown to be periodic with a frequency inversely related to the square root of the circumference of the burning fuel surface, covering the spectrum from about 1.0 Hz to 100 Hz as the effective diameter decreases from 2.0 to 0.02 m. Therefore the frequency content of fire generated noise is dependent on the size of the fire, type and state of fuel, and local conditions (humidity, temperature, oxygen availability). The changing frequency content means that the Power Spectral Density (PSD, which is power as a function of frequency interval) of a fire will change depending on these characteristics of a fire, and may be used to discern any major changes in the development of a fire. A PSD may be readily produced from the techniques described herein.

These noises produced by the fire will produce vibrations on the surface of the building containing the fire. Further, because noise and vibration are damped with distance from the fire, locating the external surface with greatest fire-induced vibration locates the fire from the exterior of the building. The complete time development of the fire may be discerned from vibrations on the building exterior. In a similar manner a building defect is localized by imaging or scanning and determining the area of greatest anomaly in, for example building damping characteristics.

Locating the area of greatest "fire noise" permits the subject system and methodology to be used to rapidly locate hidden fires deep inside of a building, which have been a significant historical cause of loss of life from structural collapse, by quickly scanning relevant walls and detecting the surface vibration "noise" from the fire itself on the wall closest to the fire.

Figure 4:
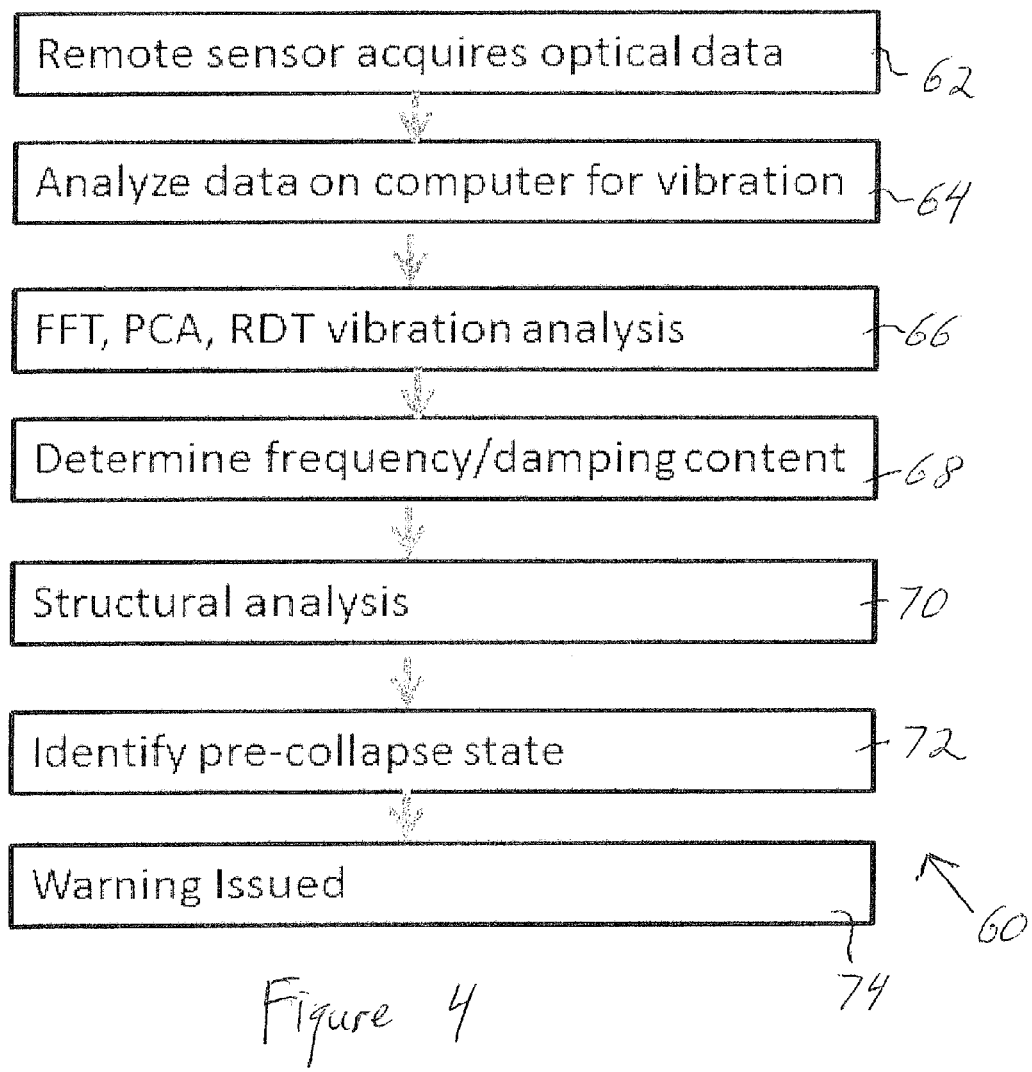
FIG. 4 is a flow chart of a method for detecting structural problems caused by fire.

A basic flow chart of a method 60 for detecting structural problems caused by fire is shown in FIG. 4. Reflection or scattering data is acquired, step 62. The data is stored on a computer and analyzed to detect the vibration or damping of interest, step 64. The data is analyzed for vibration by performing a Fast Fourier Transform (FFT), Principal Component Analysis (PCA), Random Decrement Analysis (RDT), or equivalent analysis technique, step 66, and the frequency/damping content is determined and then displayed and stored by the computer, step 68. This data is used by the computer to conduct a structural analysis, step 70. The results of the structural analysis are then used to identify a pre-collapse state, step 72, and then a warning can be issued, step 74.

Figure 5:
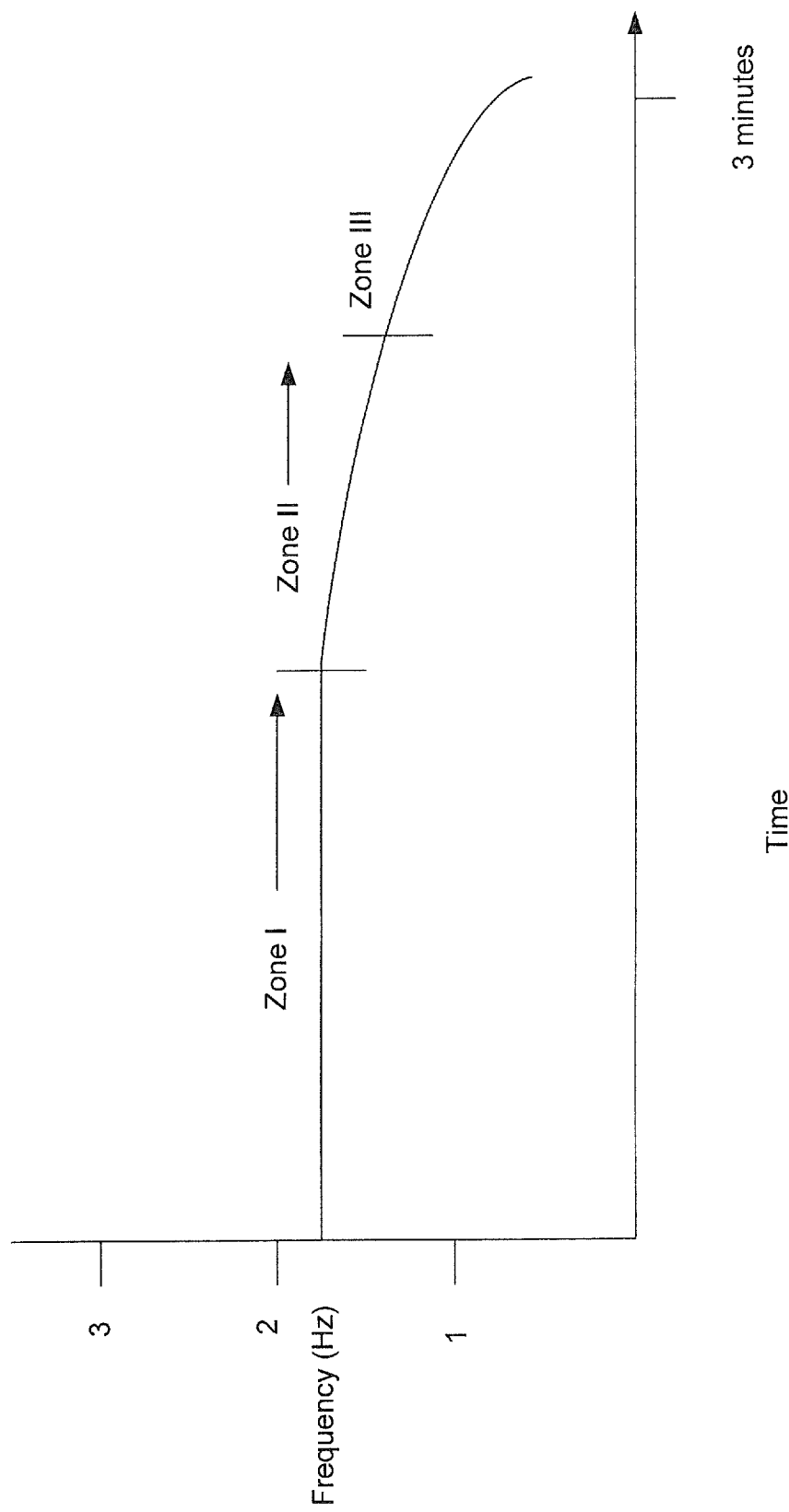
FIG. 5 is a time/frequency two dimensional plot of a short term fundamental resonance from a building surface.

A typical anticipated raw data set is shown in FIG. 5. These data are from a building surface, under different circumstances, but illustrate very precisely what may be observed in the case of a fire. This is a time/frequency two dimensional plot of short term resonant frequency. The line indicates a fundamental resonance mode, at around 1.8 Hz that is relatively constant (over a time indicated as zone I), indicative of a stable building state in which the fundamental frequencies or damping are unchanging. The resonant frequency then declines with time (over a time indicated as zone II), indicative of a slow change in fundamental frequency or damping as damage begins. The resonant frequency finally begins a precipitous change (over a time indicated as zone III), indicative of a building pre-collapse state in which only minutes of stability remain. The fundamental frequency of a frame member in a building is given by $n\sqrt{T/m} * L/2 * L$, where n is an integer (1, 2, 3 etc.), T is the tension of the member, m is mass, and L is length. When heated by fire, metal and wood will expand, tension and length will increase. Since buildings are designed for thermal expansion, which will initially minimize tension changes from thermal expansion, this relationship to first order will be dominated by the length change, so the frequency will decrease with $1/\sqrt{L}$. It is in fact observed that resonant frequencies of buildings decrease as fire damage occurs. A decline in an observed resonant frequency like this is indicative of major structural change (length expansion).

In addition to fundamental frequency, systemic damping in a building structure is a well developed method of measuring integrity in seismology. Most materials, including metal and wood, expand when heated, and joints and abutments become looser with rising temperature. As this occurs, and additionally as structural elements in a building fail, the damping of the building will decrease. Therefore the vibrations present in the building will decrease more slowly ("damp out" more slowly), and the "noise" like character of the PSD at lower frequencies will increase. This is an indicator of reduced damping, i.e., the frame of the structure is becoming more loosely connected with itself and with its coverings. This systemic damping property of a structure is routinely extracted from the vibration pattern in seismology using, for example, the Random Decrement Method.

When either of these two diagnostics (frequency and damping) decrease, structural degradation can be inferred. The degree of change from stability is related to the extent of structural damage.

Additional applications include but are not limited to structural assessment for pre-collapse state after earthquakes, terrorist events, or any other event that might threaten structural stability. The techniques do not require the use of sensors attached to the structure. Thus in an emergency situation personnel may readily evaluate the stability of a structure before it is entered. The existence and location of fire in a structure may also be determined.

Features of the invention are shown in some drawings and not others. Such features may be combined in manners not disclosed in the drawings or described in the text, as would be apparent to one skilled in the technical field of the invention.

What is claimed is:

1. A method for non-contact sensing of the integrity of a structure, comprising:

remotely detecting light that has been reflected off of or scattered from the structure; and analyzing the detected light to determine the structural integrity of the structure, wherein the analyzing step comprises determining the intensity and polarization of detected ambient light, wherein one or more polarization filters are used to filter the reflected light before it is analyzed, and wherein the analyzing step further comprises resolving one or more peaks in a power spectrum of the detected light.

2. The method of claim 1 wherein resolving one or more peaks in the power spectrum of the detected light comprises determining a frequency of the peaks.

3. The method of claim 1 wherein the light is detected over time, and the analyses thereof are stored, wherein stored analyses are compared.

4. The method of claim 3 wherein the comparisons are used to detect gradual structural changes in the structure.

5. The method of claim 1 wherein the structure is scanned so as to survey different areas of the structure.

6. The method of claim 5 wherein the analyzing step comprises creating a pixel-by-pixel frequency map of the scanned areas.

7. The method of claim 1 further comprising actively illuminating the structure with polarized light so as to enhance the results.

8. The method of claim 1 wherein the analyzing step comprises determining whether there is a fire in the structure.

9. The method of claim 8 wherein the detected light is analyzed for characteristic acoustic emanations of a fire.

10. The method of claim 8 wherein the detected light is analyzed for frequency content indicative of fire and/or the extent and size of a fire.

11. The method of claim 8 wherein the magnitude of sensed structure vibrations is indicative of the location of the fire.

12. The method of claim 11 wherein the fire is located close to the location of vibrations with a greatest magnitude.

13. The method of claim 8 wherein the detected light is analyzed for high frequency cutoff indicative of a volume of the fire.

14. The method of claim 1 wherein the analyzing step comprises determining whether the structure has degraded.

15. The method of claim 14 wherein the detected light is analyzed for changes in damping of vibration by the structure.

16. The method of claim 15 wherein a decrease in damping is equated with structural degradation.

17. The method of claim 16 wherein the detected light is analyzed for frequency content indicative of structural degradation.

18. A method for non-contact sensing of the integrity of a structure, comprising:

remotely detecting light that has been reflected off of or scattered from the structure, wherein the structure is scanned so as to survey different areas of the structure; and analyzing the detected light to determine the structural integrity of the structure, wherein the analyzing step comprises creating a pixel-by-pixel frequency map of the scanned areas.

19. A method for non-contact sensing of the integrity of a structure, comprising:

remotely detecting light that has been reflected off of or scattered from the structure; and analyzing the detected light to determine the structural integrity of the structure, wherein the analyzing step comprises determining whether the structure has degraded, and wherein the detected light is analyzed for changes in damping of vibration by the structure.

* * * * *